United States Patent [19]
Haaser et al.

[11] Patent Number: 5,938,080
[45] Date of Patent: Aug. 17, 1999

[54] SYSTEM AND APPARATUS FOR DISPENSING HIGH-VISCOSITY PIGMENTS

[75] Inventors: James D. Haaser, Lancaster, Ohio; David L. Kunkle, Ball Ground, Ga.

[73] Assignee: The Geon Company, Avon Lake, Ohio

[21] Appl. No.: 08/803,588

[22] Filed: Feb. 21, 1997

[51] Int. Cl.[6] ........................................................ B65B 1/04
[52] U.S. Cl. .......................... 222/144; 222/144.5; 141/104
[58] Field of Search ................................. 222/144, 144.5, 222/387, 334; 141/9, 104, 95, 83, 105, 18

[56] References Cited

U.S. PATENT DOCUMENTS

| | | |
|---|---|---|
| 2,848,019 | 8/1958 | Corbin et al. . |
| 3,029,847 | 4/1962 | Baudhuin et al. . |
| 3,066,830 | 12/1962 | Heiss et al. . |
| 3,878,907 | 4/1975 | Morick . |
| 4,027,785 | 6/1977 | Edstrom et al. . |
| 4,096,972 | 6/1978 | Bartels et al. . |
| 4,103,722 | 8/1978 | Zollinger . |
| 4,258,759 | 3/1981 | Achen . |
| 4,314,653 | 2/1982 | Sindoni . |
| 4,656,600 | 4/1987 | Swann . |
| 4,705,083 | 11/1987 | Rossetti . |
| 4,813,785 | 3/1989 | Miller . |
| 4,844,297 | 7/1989 | Smith . |
| 4,878,601 | 11/1989 | Flemming et al. . |
| 4,946,100 | 8/1990 | Flemming et al. . |
| 4,953,985 | 9/1990 | Miller . |
| 4,967,938 | 11/1990 | Hellenberg . |
| 5,078,302 | 1/1992 | Hellenberg . |
| 5,119,973 | 6/1992 | Miller et al. . |
| 5,431,200 | 7/1995 | Mariotti ............................ 141/83 |
| 5,445,195 | 8/1995 | Kim . |
| 5,474,211 | 12/1995 | Hellenberg . |
| 5,558,251 | 9/1996 | Neri . |

OTHER PUBLICATIONS

The IDS2012 Ink carousel, Hudson's Good Impressions Jul. 1995, 1 page advertisement.

*Primary Examiner*—Steven O. Douglas
*Attorney, Agent, or Firm*—Joe A. Powell

[57] ABSTRACT

A fluid dispensing apparatus for automated dispensing high-viscosity fluids for mixing applications, such as dispensing of pigment concentrates for mixing screen printing inks and paints includes a rotatable carousel containing a plurality of different pigment concentrate supplies. The carousel is selectively rotated into a dispensing position in alignment with a dispensing pump and the pump is actuated to dispense through a dispensing valve assembly associated with each pigment concentrate supply. The dispensing valve assembly includes a pair of dispensing valves having different valve orifices so that the pigment concentrates may be dispensed in coarse and fine iterations into a container for mixing.

15 Claims, 8 Drawing Sheets

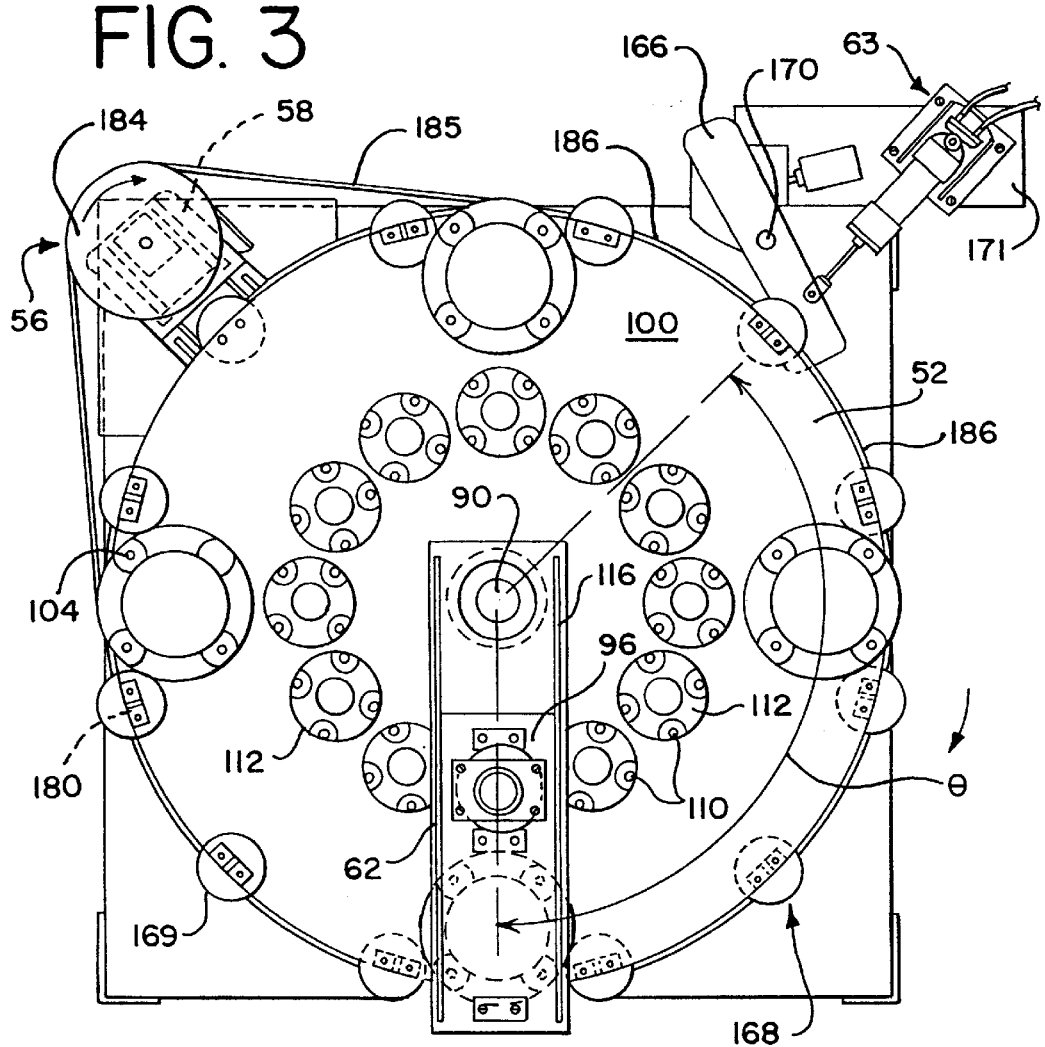

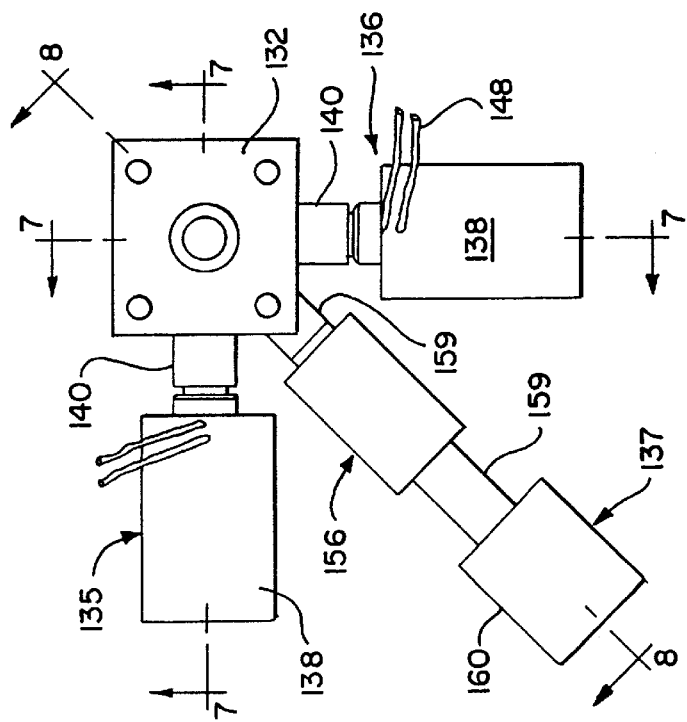
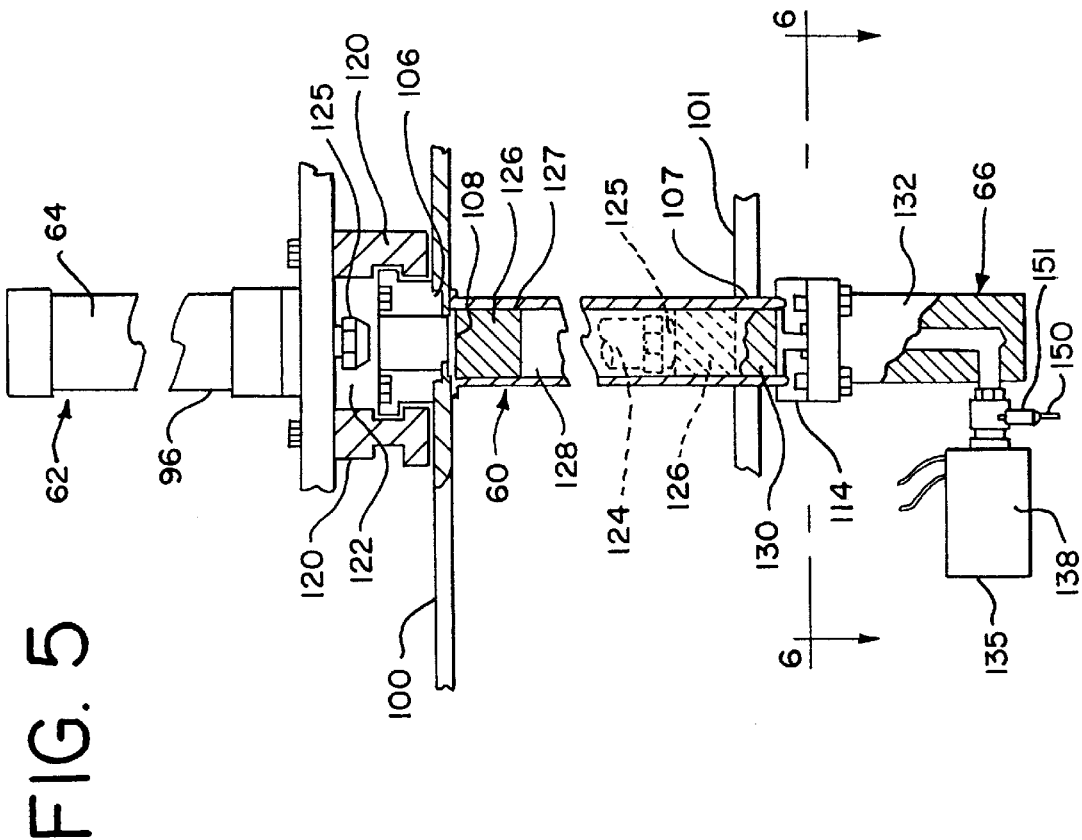

SYSTEM AND APPARATUS FOR DISPENSING HIGH-VISCOSITY PIGMENTS

BACKGROUND OF THE INVENTION

The present invention relates generally to fluid dispensing apparatus and more particularly, to an apparatus for dispensing high viscosity paints and pigments therefor.

Dispensing machines are commonly used in the art of paint mixing to dispense desired amounts of colorants into a base medium to make a certain color. Typically, known dispensing machines have utilized a plurality of dispensing reservoirs in the form of hollow cylinders with each reservoir having its own dispensing valve. The large number of reservoirs required a large amount of space. Some of these machines are used to perform volumetric mixing, that is, certain amounts of colorants are individually dispensed by volume from their respective supply reservoirs. Furthermore, such dispensing is done by relying on the force of gravity, and therefore such types of dispensing machines are only feasible with low viscosity colorants that are conducive to gravity flow.

In instances when paints or inks are mixed using high viscosity inks or paints, such as in the silk-screening arts, it is impractical to use the machines described above, primarily because of the high viscosity of the fluid medium being dispensed which can range from about 15,000 to about 175,000 Centipoise. In order to overcome this disadvantage, some dispensing apparatus have been developed in the form of complex dispensers that utilize a plurality of high pressure pumps, with one pump being associated with each supply reservoir. The large number of pumps not only significantly increases the cost of such a machine and the large number of pigment or colorant reservoirs, but also increases the floor space required for the machine.

The present invention is directed to a dispensing apparatus for dispensing high-viscosity colorants, such as in the form of pigment concentrates, that overcomes the disadvantages of the prior art as described above.

SUMMARY OF THE INVENTION

In accordance with the principles, an automated dispensing apparatus is provided which is particularly suitable for use with high-viscosity colorants such as those referred to in the industry as pigment concentrates ("PCs") used in the screen printing industry. The apparatus includes a plurality of PC storage reservoirs, in the form of hollow cylinders disposed in a circular pattern on a rotatable turret or carousel assembly. A single high-pressure pump is mounted on the apparatus above the turret in the form of a powered cylinder and is aligned with the PC supply reservoirs.

In operation, the turret is rotated into place so that a selected PC supply reservoir is aligned with and disposed underneath a plunger portion of the powered cylinder. When the cylinder is activated, it extends the plunger and applies a force to the high-viscosity PC supply within the reservoir, thereby forcing the PC out through a valve assembly. A scale that is separately mounted on a pedestal and is isolated from the turret provides a pedestal for a mixing container, or receptacle. The scale, the turret and the power cylinder are all operatively connected together and controlled by a controller so that accurate and reliable gravimetric (i.e., by weight) dispensing of the selected PC is made into the mixing container.

A dispensing valve assembly communicates with the PC supply reservoir and includes a pair of dispensing nozzles for high and low pressure dispensing. Part of the dispensing valve assembly incudes a charging valve assembly for refilling the PC supply reservoir. A programmable controller links the various components of the apparatus together in a manner so that multiple dispensing iterations of a single PC are performed to obtain dispensing accuracies for a batch accuracy in the range of 1.5%.

In one principal aspect of the present invention, the apparatus turret includes a plurality of PC supply reservoirs in the form of hollow cylinders held between two end plates. The PC supply reservoirs contain pistons accessible from their tops and may be selectively rotated into and out of communication with a high pressure pump in the form of a powered cylinder. The cylinder has a plunger that enters the PC supply reservoir cylinder and impinges upon the piston, such that movement of the cylinder plunger applies a dispensing force on the PC within the supply reservoir to force it out through a dispensing valve assembly attached to the lower end of the PC supply reservoir.

In another principal aspect of the present invention, the dispensing apparatus includes an indexing mechanism locating the PC supply reservoirs in alignment with and underneath the high pressure pump. This indexing mechanism includes a plurality of indexing bosses that correspond in number to the PC supply reservoirs. The indexing bosses are supported on one of the two turret endplates and are spaced circumferentially around the perimeter of the endplate in an angular spacing corresponding the same spacing for the PC supply reservoirs. A reciprocatable catch arm that is moved into and out of engagement with the indexing bosses is outside the perimeter of the endplate. In order to identify the particular PC supply reservoir aligned into position for dispensing by the high-pressure pump. The indexing mechanism may include a identifying mechanism that reads each particular PC supply reservoir as it rotates. In the preferred embodiment, a sensing mechanism utilizing magnetic sensors is mounted outside the perimeter of one of the turret endplates and "reads" the identity of each PC supply cylinder as the turret revolves.

In yet another principal aspect of the present invention, the dispensing valve assembly includes two dispensing nozzles which are selectively used for dispensing PC under high or low pressure at either large or small nozzle conditions. These nozzles are actuated by solenoid valves that are operatively corrected to the apparatus controller so that a particular PC may be disposed in multiple iterations at different appropriate pressure and nozzle conditions to obtain dispensing accuracies in the order of about +/−1%, down to about 0.5 grams.

In still another principal aspect of the present invention, the PC supply reservoirs have a single open end that communicates with the dispensing valve assembly. The charging part located on the dispensing valve assembly permit the PC supply reservoir to be filled from the bottom of the PC supply cylinder, thereby eliminating the need to have the PC supply cylinders open at their tops which would afford the opportunity for contamination. Additionally, this location reduces the vertical clearance requirements of the apparatus.

Accordingly, it is an object of the present invention to provide an improved dispensing apparatus for use with high-viscosity inks and paint concentrates that includes a rotatable carousel that supports a plurality of different paint concentrate supplies and selectively positions the supplies in alignment with a dispensing pump to selectively dispense concentrates for mixing.

Another object of the present invention is to provide an automatic dispensing apparatus for high-viscosity liquid pigments, wherein the apparatus includes a rotatable carousel that supports a plurality of pigment supplies, a pumping station aligned with the pigment supply carousel and supporting a pumping mechanism in a pumping location wherein individual pigment supplies may be rotated into engagement therewith, and a plurality of dispensing assemblies, one of such assemblies being associated with a single pigment supply, each dispensing valve assembly including multiple dispensing valves for selectively dispensing pigments from the pigment supplies at different pressures and flows thereby increasing the accuracy of the dispensing.

Yet another object of the present invention is to provide a dispensing apparatus for dispensing high-viscosity pigment concentrates into a container for mixing a particular color, the dispensing apparatus including a plurality of discrete pigment concentrate supply cylinders, a single pumping mechanism for pumping pigment concentrate from the pigment concentrate supply cylinders, a turret assembly rotatably supporting the pigment concentrate supply cylinders beneath the pumping mechanism, a drive mechanism for selectively driving the turret assembly in rotation to selectively position a discrete pigment supply cylinder in pumping alignment with the pumping mechanism, an indexing mechanism for identifying the pigment supply cylinders on the turret assembly and indexing them into a pumping position, a plurality of dispensing valves associated with the pigment concentrate supplies for dispensing under pressure, calculated amounts of a pigment concentrate into a mixing container and a programmable controller that operatively interconnects the pumping mechanism, drive mechanism, indexing mechanism and dispensing valves together.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 3 is a top plan view of the dispensing apparatus of FIG. 2, also with some of the components thereof removed for clarity;

FIG. 4 is an enlarged detail view of a portion of the indexing mechanism used in the dispensing apparatus of FIG. 1;

FIG. 5 is an elevational view, partially in section of the high pressure cylinder mated with a pigment supply cylinder;

FIG. 6 is a top plan view taken along lines 6—6 of FIG. 5 illustrating the dispensing assembly associated with each pigment supply cylinder;

DETAILED DESCRIPTION OF THE PREFERRED EMBODIMENTS

Figure 1:
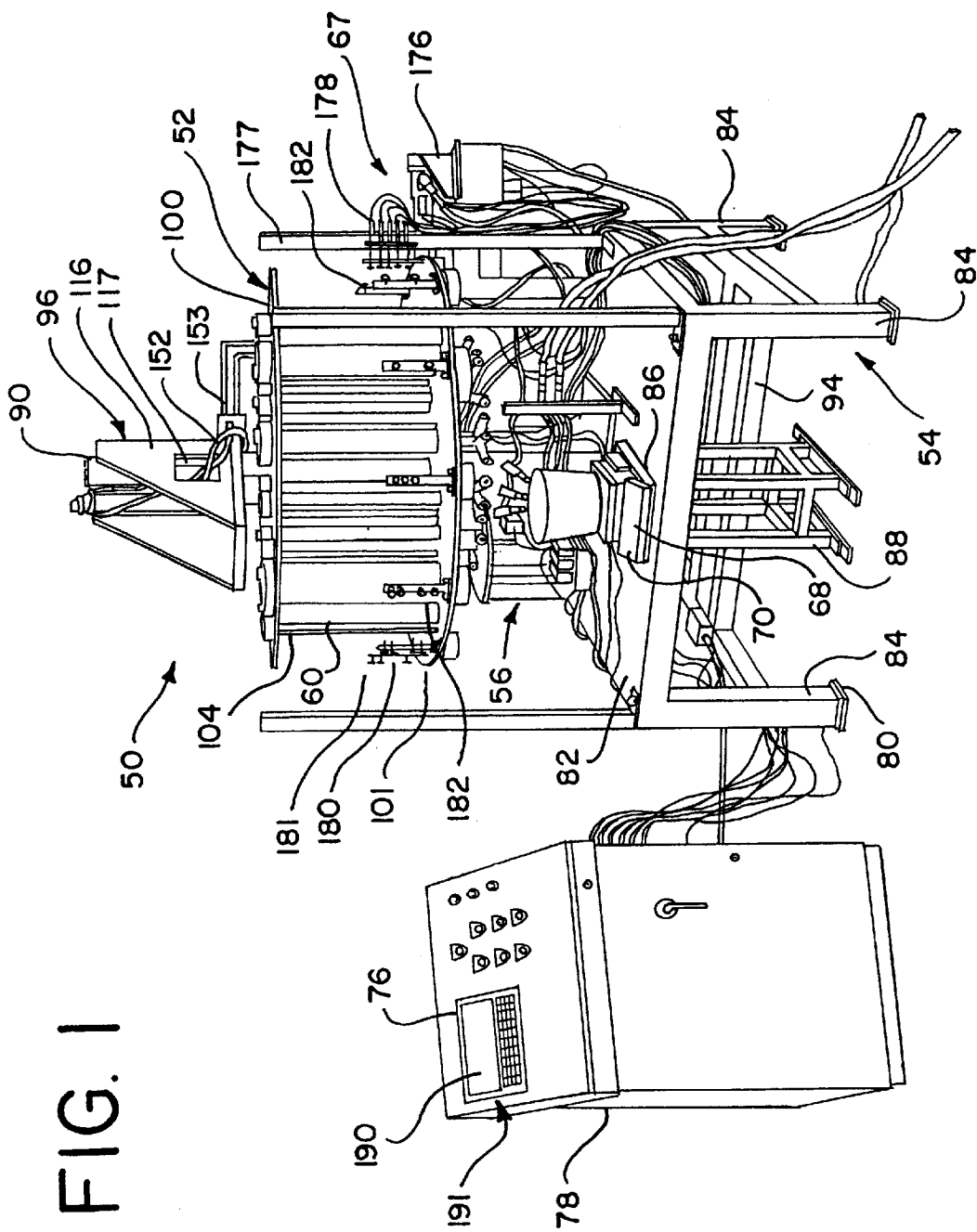
FIG. 1 is a perspective view of a dispensing apparatus constructed in accordance with the principles of the present invention.

FIG. 1 illustrates a dispensing apparatus 50 constructed in accordance with the principles of the present invention. The apparatus 50 is particularly suitable for dispensing precalculated amounts of high-viscosity paint pigments, such as silk screening inks used in the screen printing industry. These inks or paints are commonly mixed on-site at a printing plant by adding one or more pigments to a base medium. Some of these pigments are available in highly concentrated forms and are referred to in the industry and in the description to follow as pigment concentrates or "PCs". Due to their concentrated nature, these PCs are high viscosity liquids with common viscosities having a range of viscosities of between about 15,000 to about 175,000 Centipoise.

The dispensing apparatus 50 of the present invention provides a means for accurately and reliably dispensing the high-viscosity pigment concentrates into a container for mixing the PCs with a base medium into a preselected color. The apparatus 50 includes a PC supply carousel, or turret 52, that is rotatably mounted to a base 54 and selectively driven in intermittent rotation by a suitable driving means 56 such as a belt assembly 185 driven by a motor 58. A plurality of PC supply cylinders 60 are mounted on the turret 52 in alignment with a pumping means 62 illustrated as a hydraulic cylinder 64.

Each of the PC supply cylinders 60 is hollow with an interior PC supply reservoir 128 defined therein that holds a preselected quantity 130 of PCs. Each PC supply cylinder 60 has a PC dispensing assembly 66 associated therewith. A weighing means 68, such as the scale 70 illustrated is provided for weighing the amount of PC that is dispensed into a container 72 for mixing. The various operational means and mechanisms of the dispensing apparatus 50 are operatively interconnected together and run as a unit by a suitable control means, such as a programmable controller 76, incorporated within a separate control console 78, at which an operator may control the operation of the dispensing apparatus 50 from a remote location, if desired.

The apparatus 50 includes a structural support base 54, illustrated as a table 81, that has a flat planar top surface 82 supported by multiple legs 84. The base top surface 82 has an isolation opening 86 formed therein in registration with the PC pumping means 62 and the opening 86 receives a scale stand 88 that provides a sole supporting platform for the paint weighing scale 70. The stand 88 is preferably smaller in area than the opening 86 so that it stands vertically therein without contacting any portion of the apparatus support base 54, thereby isolating the weighing scale 70 from the operating components and mechanisms of the dispensing apparatus 50 to thereby permit any transmission of vibrations incurred in the base 54 during operation of the dispensing apparatus 50.

The PC Supply Turret

Figure 2:
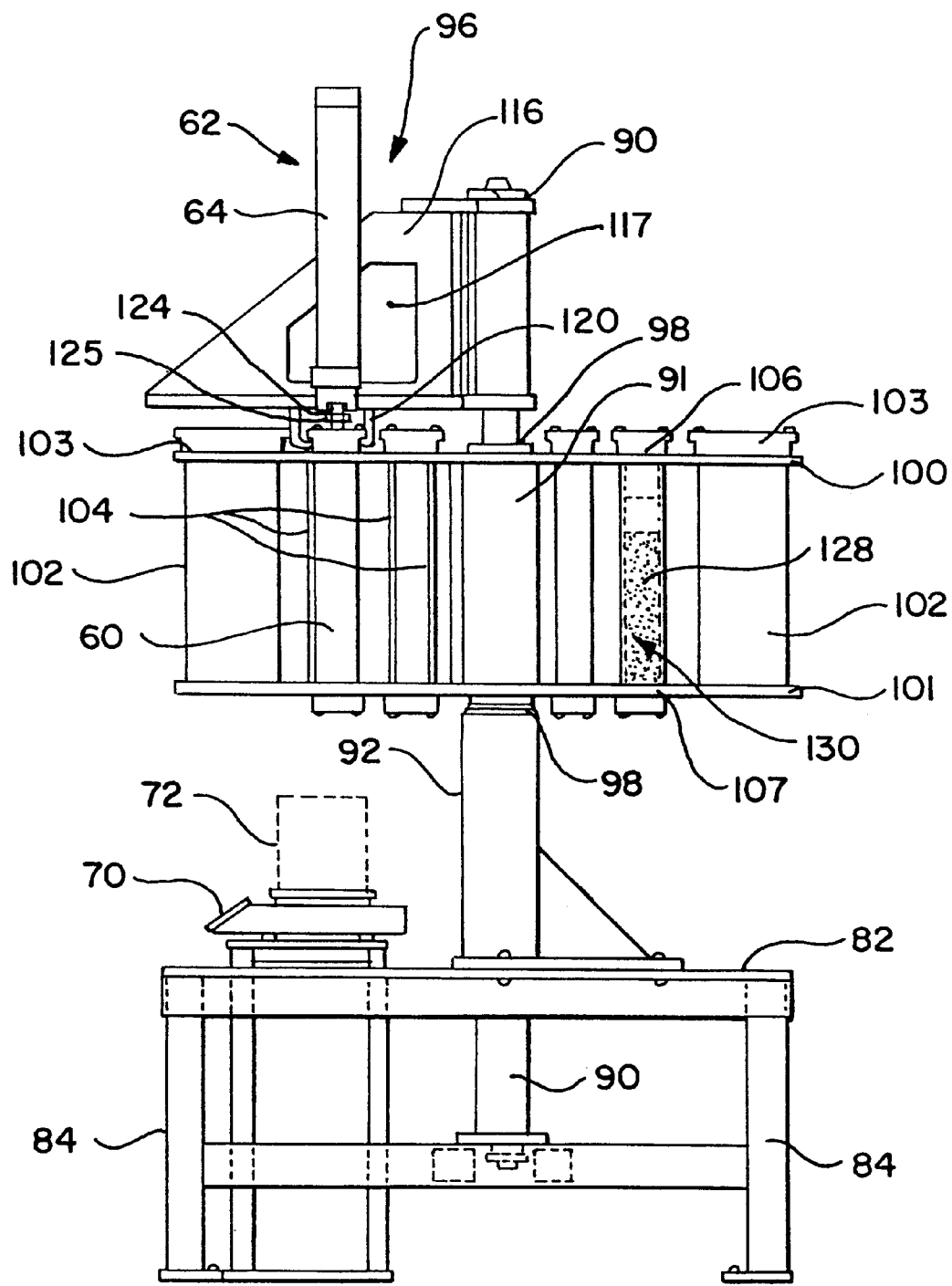
FIG. 2 is a side elevational view of the dispensing apparatus of FIG. 1, with some of the components thereof removed for clarity.

As mentioned above, the dispensing apparatus 50 includes a rotatable turret 52 that supports a plurality of PC supply cylinders 60. The base 54 of the dispensing apparatus 60 includes a center post 90 vertically mounted thereon and which typically may include one or more protective support tubes 91, 92 that extend upwardly from the lower bracing 94 of the base 54 up to the top of a pumping head 96. The tubes 91, 92 may include bushings 98 located thereon at the level of the turret components. As shown best in FIGS. 2 and 3, the turret 55 includes a pair of circular endplates 100, 101 spaced apart from each other. The endplates 100, 101 rotatably engage the post 90 via the bushings 98 and support a plurality of PC supply cylinders 60 thereon in a preselected circular pattern as seen best in FIG. 3. A series of support members illustrated as large diameter tubes 102 may be positioned on the turret 52 between the endplates 100, 101 and are held in place thereon by endcaps 103, preferably in the form of the collars shown that receive elongated tie rods 104.

The top and bottom turret endplates 100, 101, as illustrated in FIG. 5 have openings 106, 107 formed in them corresponding to the patterns in which the hollow PC supply cylinders 60 are arranged thereon. The top openings 106 communicate with the open ends 108 of the PC supply cylinders 60 while the bottom openings 107 are large enough to accommodate the passage of the PC supply cylinders 60 therethrough. The turret endplates 100, 101 may also be tapped in proximity to these openings 106, 107 to accommodate bolts or nuts 110 that secure the PC supply cylinders 60 in place. A hollow collar 112 may be used as illustrated in the drawings to attach the top each PC supply cylinder 60 to the top turret endplate 100, while a hollow cap block 114 may be used to attach the bottom of each PC supply cylinder 60 to the turret bottom endplate 101.

The PC Dispensing Pump Assembly

The dispensing apparatus 50 is provided with a pumping means 62 positioned in a pumping head 96 that is supported on the center post 90 above the turret top endplate 100. The pumping head 96 extends radially outwardly along a preselected radius of the turret 52 and above the turret top endplate 100. This assembly 96 includes a pair of mounting brackets 116 which provide structural support for a high-pressure PC pump cylinder 64. The brackets 116 may include access openings 117 formed therein to permit the passage of various hydraulic fluid supply lines 118. As stated above, the pumping head 96 is supported above the turret top endplate 100 at a level that provides enough clearance for the support endcaps 103 and PC supply cylinder mounting collars 112 to pass easily underneath. The pumping head 96 preferably includes one or more clamping members illustrated as clamp arms, or blocks 120, that depend downwardly therefrom and which are circumferentially spaced apart from each other along a circular pattern approximately coincident with the circular pattern in which the PC supply cylinders 60 are positioned. The clamp blocks 120 cooperatively define a nest 122 therebetween which receives the top mounting collars 112 of the PC supply cylinders therein in alignment with the pumping cylinder 64.

Turning now specifically to FIG. 5, the PC pumping cylinder 64 is preferably a hydraulic cylinder and includes an extendible rod, or ram 124, with a plunger-style head 125 attached thereto. The plunger 125 preferably has an outer diameter that is slightly less that the inner diameter of the PC supply cylinders in order to permit unimpeded travel of the plunger 125 in and out of any PC supply cylinder 60 located in position beneath it. In practice, it has been found that suitable results have been obtained using a plunger head having a diameter of 1.75 inches and a PC supply cylinder having a diameter of 2-½ inches.

Each PC supply cylinder 60 has an internal piston 126 (without any piston rod associated therewith) slidably disposed therein. The piston 126 is sized appropriately to facilitate movement of it in the PC supply cylinder 60 and preferably further includes a ring assembly 127 to ensure that a fluid-tight seal is effected between the piston 126 and the walls of the PC supply cylinder 60. The piston 126 is disposed toward the top of the PC supply cylinder 60 and, in effect, seals the PC 130 stored in the reservoir 128 defined in the supply cylinder 60 from the environment. This seal beneficially presents the introduction of contaminants such as dust, dirt, oil and the like into the PC which might occur if the top of the supply cylinder 60 were open to the atmosphere. Actuation of the piston 126 by the cylinder plunger 125 forces the PC supply 130 out of its supply cylinder 60 and through the lower cap block 114 into an associated dispensing assembly 66.

The PC Dispensing Valve Assembly

Figure 7:
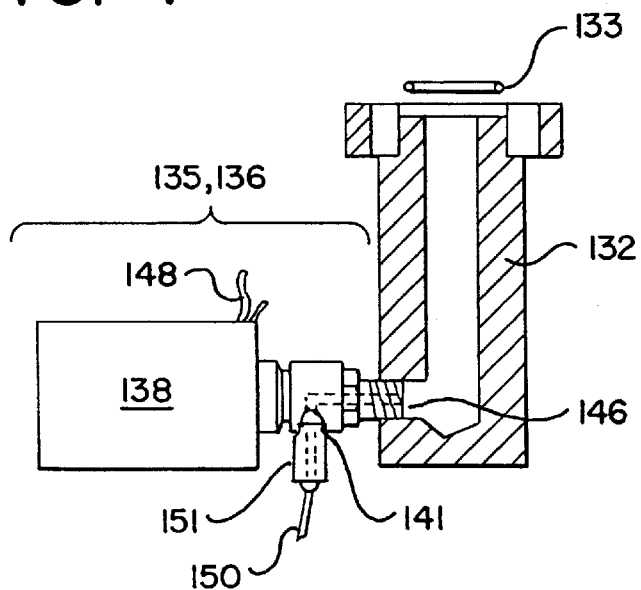
FIG. 7 is a sectional view of the two dispensing valves of the valve assembly of FIG. 6 and taken along either of lines 7—7 thereof.
Figure 8:
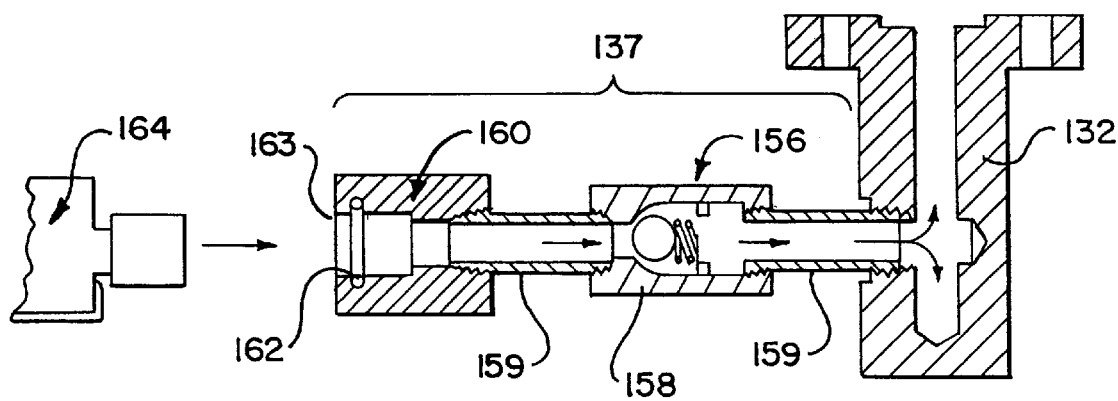
FIG. 8 is a sectional view of the pigment supply cylinder charging mechanism attached to the valve assembly of FIG. 6 and taken along lines 8—8 thereof.

Each PC supply cylinder 60 has a dispensing assembly 66 associated therewith at a level beneath the turret bottom endplate 101 through which a selected amount of PC pass through into a container 72 positioned beneath it on the weighing scale 70. FIGS. 6–8 illustrate the dispensing valve assembly 66 and the Figures depict a hollow manifold 132 that is mounted to the lower cap block 114, such as by bolts, in a fluid-tight manner, utilizing an elastomeric O-ring 133 or other flexible seal member along the mating surfaces of the manifold 132 and the cap block 114. The manifold 132 in essence supports three distinct valves 135, 136 and 137. Two of the valves 135, 136 are PC dispensing valves while the remaining valve 137 is a PC charging or refill valve. The two PC dispensing valves 135, 136 are horizontally connected to the manifold 132 at about the same level and are angularly spaced apart 90° from each other as illustrated in FIG. 6. The two valves 135, 136 and their associated components are identical with the exception of their orifice sizes because the one valve 135 is used to dispense PC at high-pressure flow conditions while the other valve 136 is used to dispense PC at low-flow conditions.

The dispensing valves 135, 136 are illustrated in the preferred embodiment as solenoid-operated valves with a solenoid operator 138 mounted in line with the valve body 140 and extending horizontally outwardly from the valve manifold 132. As is known in the art, the operator 138 electrically controls a valve stem (not shown) in movement in and out of contact with a valve seat 142 so respectively open and seal off a hollow PC dispensing passage 144 in the valve body 140. The valve body 140 may be equipped with a threaded nipple 145 that is received within one of the two valve openings 146 of the manifold 132. The horizontal mounting of the dispensing valves 135, 136 permits control wire 148 to be run to the solenoid operator 138 in a manner that does not interfere with the valve port 141 and thus dictates the use of a right-angle valve body 140. One such suitable valve is a miniature poppet valve, sold by Clippard under the designation No. WAV-2P, and a suitable solenoid is a Clippard No. AVS-12.

As will be explained in greater detail below, the dispensing apparatus 50 has the ability to pump out PCs at different pressures through different nozzles of the two dispensing valves 135, 136. The use of the two solenoid dispensing valves 135, 136 complements and enhances this ability. Due to the ranges of PC that are added to a base medium at different amounts varying in amounts from as much as about 200 grams to about 0.5 grams, the dispensing apparatus 50 and particularly dispensing valves 135, 136 thereof are provided with very fine dispensing orifices. These orifices are provided by two hypodermic needles 150 that held in suitable adapters 151 in line with the valve port 141. The needle 150 used in dispensing valve 135 has a relatively large orifice, about 0.056 inches in diameter and is used for dispensing coarse amounts of PCs under high pressure that are greater than about 2 grams. The other dispensing valve 136 uses a hypodermic needle 150 with a smaller orifice of about 0.020 inches in diameter to dispense fine amounts of PCs from about 1.5 grams to about 0.5 grams.

When the PC pumping means 62, i.e. the pump cylinder 64, is actuated at different pressures, the controller 76, in accordance with the pressure, will operate one of the two dispensing valves 135, 136 for the particular PC supply cylinder 60. Typically one valve is used for a coarse dispensing of PC, while the other valve is used for fine dispensing of PC.

In order to effect the desired pressure and flow variations, the PC pump cylinder 64 may be powered by two different hydraulic fluid supplies through two fluid supply hoses 152, 153. These two hydraulic fluid supplies are preferably charged at different fluid pressures, such as 100 psi and 600 psi so that an appropriate fluid pressure may be directed to the pump cylinder 62 to dispense the desired amount of PC from a supply cylinder 60 at a particular pressure through one of the two dispensing valve orifices. These preselected fluid pressures may be maintained by equipping each fluid supply line with a distinct relief valves, each with a different operational backpressure.

The PC Supply Cylinder Charging Assembly

In an important aspect of the present invention, a means for filling or recharging the PC supply cylinders with PC is provided in a manner that does not expose the PC or the interior of the PC supply cylinder 60 to the environment. This charging means includes the charging valve 137 which, as illustrated in FIGS. 6 and 8 is attached to a third opening 154 in the valve manifold 132 horizontally at a level spaced from (shown above in the drawings) the dispensing valves 135, 136. When viewed from the top, as in FIG. 6, the charging valve 137 is positioned roughly between the two dispensing valves 135, 136. The charging valve 137 includes a check valve 156, having a conventional spring-loaded ball check assembly 158 disposed therein and a nipple 159 that serves to connect the check valve 156 to the manifold 132 at its particular opening 154. A coupling, or adapter 160, is preferably provided as part of the overall structure of the charging valve 137 and is connected to the check valve 156, also by way of a similar nipple 159. The coupling 160 may include an O-ring 162, or other flexible sealing member, at its opening 163 to provide a reliable fluid-tight seal between the coupling 160 and a suitable PC pressure injection means, such as a hand or pneumatically-operated ink refill cartridge 164. This location of the charging valve 137 reduces the overall height of the dispensing apparatus 50 and the vertical clearance needed to accommodate it and further facilitates the refilling process inasmuch as the changing valves 137 are preferably disposed at chest height.

The Turret Indexing Assembly

In order to properly position and retain a certain PC supply cylinder 60 in a dispensing position in alignment beneath the pump cylinder 64, the present invention includes an indexing means 63, illustrated best in FIGS. 3 & 4. This indexing means 63 includes a turret catch, or retention arm 166, that is selectively operable into and out of engagement with a plurality of turret stops 168 located on the turret 52. Each of the stops 168 includes a cylindrical boss 169 that is attached to the turret bottom end plate 101, such as by bolts. The steps 168 are preferably attached along the outer perimeter 171 of the turret endplate 101 and are spaced at angular intervals thereabout that correspond to the position of a particular PC supply cylinder 60 in the turret 52 in a dispensing position beneath the dispensing pump cylinder 64. Typically, each stop boss 169 will be separated from its associated PC supply cylinder 60 by an angle θ, which in FIG. 3 corresponds to about 130°.

The PC supply cylinders 60 are preferably spaced apart from each other in their circular pattern by 30°, with the stops 168 being positioned on the perimeter of the turret endplate 101 interspersed between the PC supply cylinders 60. It will be understood that such angular relationships will depend on the number of PC supply cylinders 60 used in the apparatus 50, with the spacing being obtained by dividing 360° by the number of supply cylinders, i.e. 360° ÷by 12 =30°. The invention may be practiced with more or less supply cylinders positioned at different spacings on the turret 52.

The catch arm 166 is pivotally mounted by a pin 170 on a base 171 and is actuatable by way of a power cylinder 172 which may be powered hydraulically, pneumatically or electronically or in any other suitable manner. The cylinder 172 includes an extendable arm 173 attached to the catch arm 166. Extension of the cylinder arm 173 as shown in FIG. 3 causes the catch arm 166 to engage the stop member 169 with its hooked end portion 174 and restrain the turret 52 from any further rotation. It will be understood that the turret 52 shown in the drawings is driven clockwise in its rotation when viewed from above as in FIG. 3, so that the hooked end portion 174 of the catch arm 166 effects a positive engagement. The turret 52, of course, may be driven in another direction provided that the indexing means 63 is modified.

The PC Supply Cylinder Identification Assembly

In order for the controller 76 to recognize what discrete PC supply cylinder 60 is in place in a dispensing position on the turret 52 underneath the pumping cylinder 64, the apparatus 50 is importantly provided with a means 67 for identifying the position of discrete PC supply cylinders 60 during rotation of the turret 52. The identification means 67 includes a sensing assembly 176 mounted to a vertical support 177 that extends up from the base surface 82 in proximity to the turret 52. This sensing assembly 176 includes a plurality of individual sensors 178 (five such sensors 178 being shown in FIG. 1). The sensors 178 are mounted generally horizontally in order to sense or "read" a PC supply cylinder identification code displayed on an opposing vertical code member 180 mounted to the turret bottom endplate 101. Each code member 180 is positioned coincident with an individual turret stop boss 169. These code members 180 extend upwardly and may take the form of posts 181 having a plurality of holes 183 formed therein at predetermined spacings. The postholes selectively receive code markers, shown in the form of bolts 182 inserted therein in opposition to the sensing assembly 176.

Figure 9:
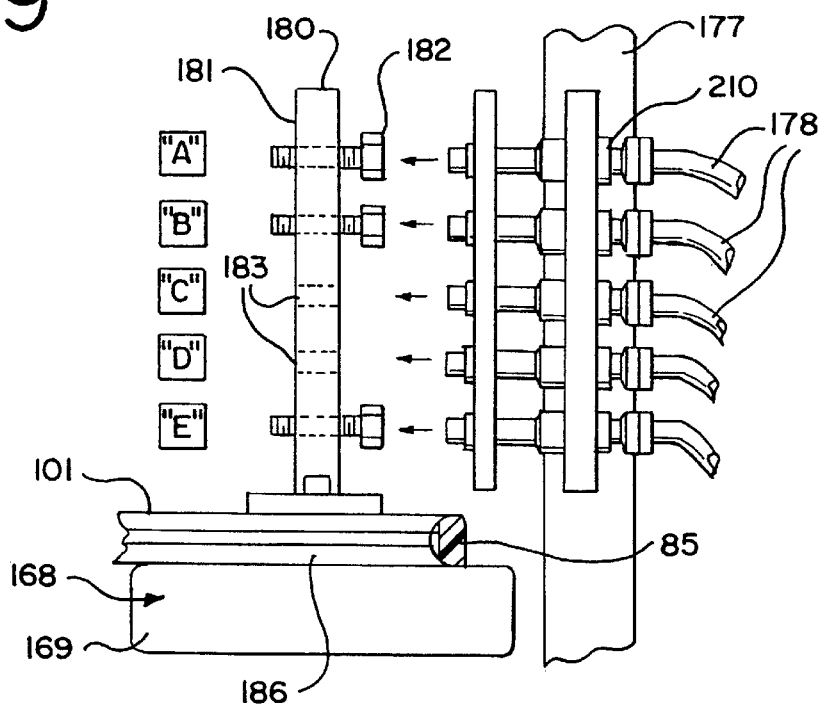
FIG. 9 is an enlarged elevational view of a portion of the dispensing apparatus of FIG. 1, illustrating in detail the PC supply cylinder code members and sensors of the sensing assembly.
Figure 10:
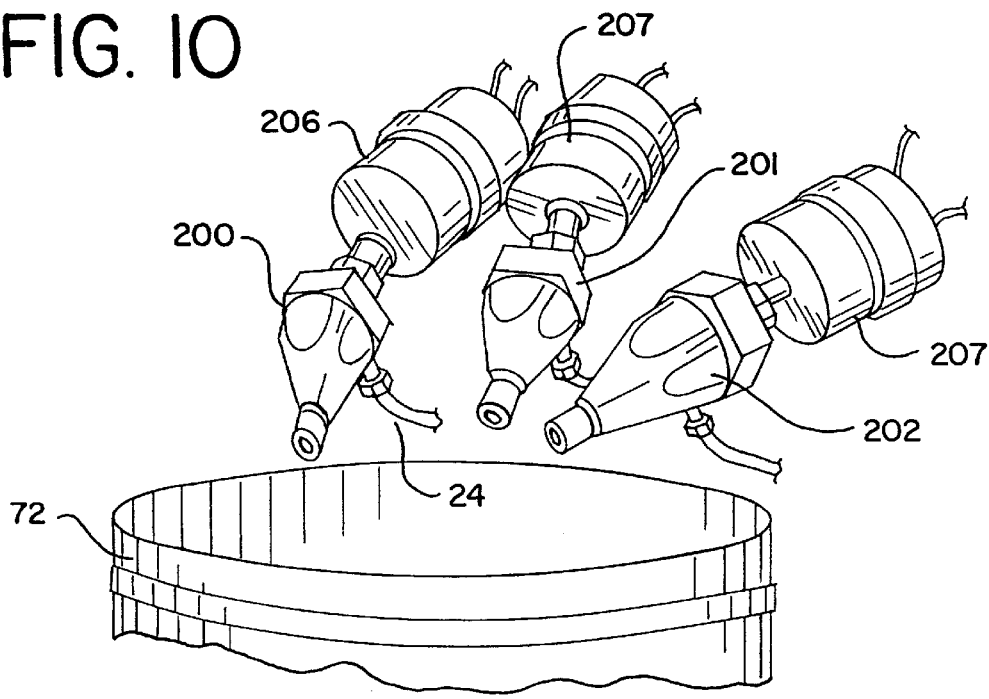
FIG. 10 is an enlarged elevational view of a portion of the dispensing apparatus of FIG. 1, illustrating in detail the base medium and white PC dispensing valve assembly.

In operation, as the code members 180 rotate past the sensing assembly 176, the sensors 178 will detect the presence of the identifying bolts 182 in the selected postholes 183 and send a signal to the controller 76 to identify the particular PC supply cylinder 60 associated with that particular PC identification code that occupies the dispensing position under the pumping cylinder 64. As specifically illustrated in FIG. 9, the sensors 178 will sense the three bolts 182 in the "A", "B" and "E" position and send an identification signal (preferably in a digital format, such as "11001") to the controller 76 which then compares that identification code to a list of such codes contained in the controller memory 189. Magnetic sensors have been used with the sensing assembly 176 with acceptable results, but other sensors, such as fiber optic, optical or electronic sensors may be used with suitable results. The sensing assembly 176 may be further equipped with lights or LEDS 210 that will light up as the bolts 182 are read to provide a visual means for the operator of the apparatus to verify that proper sensing of the supply cylinder identification codes is occurring.

The Turret Driving Assembly

The turret 52 is driven in its clockwise rotation by a driving means 56, illustrated in FIG. 3 as a turret drive motor 58 mounted in proximity to the turret bottom endplate 101. The drive motor 58 includes a drive wheel 184 mounted horizontally on the motor 58 and preferably in the same plane as the turret bottom endplate 101. The outer edge 186 of the turret endplate 101 is grooved, as shown best in FIG. 9, as is the drive wheel 184 and the two are operatively interconnected by a suitable drive belt 185, that also preferably lies in the same plane as the turret bottom endplate 101. Other suitable drive means and mechanisms may be used such as gear drives and the like.

The Dispensing Control Assembly

Figure 11:
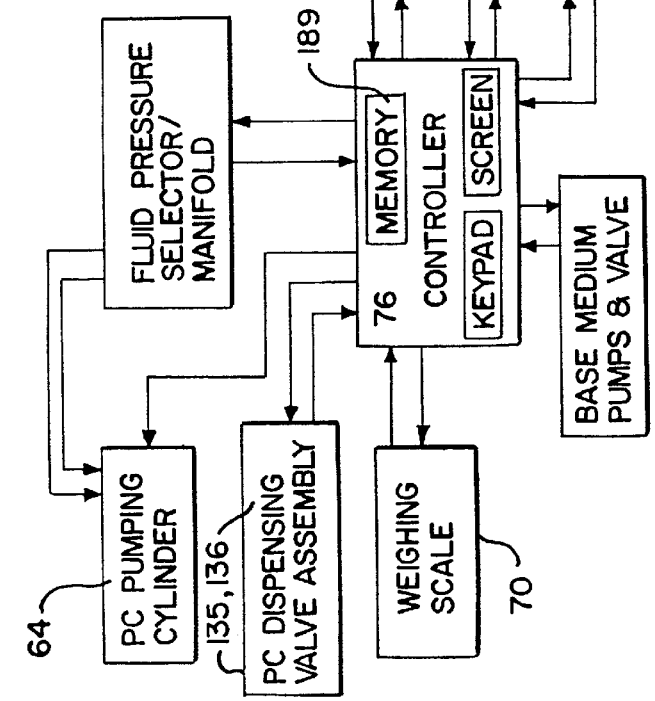
FIG. 11 is a block diagram of the control system used with the dispensing apparatus of FIG.1, illustrating schematically the controller and the components of the dispensing apparatus that it controls.

In order to monitor the progress of the dispensing apparatus 50 and to control the operation of the various assemblies described, above, the dispensing apparatus 50 is provided with a control means 74, illustrated as a programmable controller 76 that is capable of receiving a variety of output signal as input, assessing the condition of the assemblies of the dispensing apparatus 50 and sending control signals in responses thereto. As shown best in FIG. 11, the controller 76 is interconnected to the turret drive means 56, the turret indexing means 67 and PC supply cylinder sensing assembly 176 and thereby controls the revolution of the turret 52 to move discrete PC supply cylinder 60 into a dispensing position in serial order according to a paint or ink formula or recipe. The PC supply cylinder's "code" is read off of a code member 180 by the sensing assembly 176 and the identity of the PC supply cylinder 60 at the dispensing position is thus known. The turret rotation is either stopped (if the PC supply cylinder 60 is the proper cylinder for dispensing) or continued until the appropriate PC supply cylinder is in place. The controller 76 thereupon will signal the indexing means 63 which triggers the locking arm 166 into contact with an appropriate stop boss 169 to lock the turret into place.

Once the appropriate PC supply cylinder 60 is in a dispensing position, the controller 76 reads the amount, in grams, of that PC to be dispensed. The pumping head plunger 125 is extended into the PC supply cylinder 60 up against the supply cylinder piston 126 and a fluid pressure is selected for actuating the pumping plunger 125. A signal is also sent to the appropriate dispensing valve 135, 136 of the dispensing valve assembly 66. Typically, a coarse flow of PC under high pressure is first selected and high pressure fluid will be selected. The pumping plunger 125 is actuated and a gross amount of PC is dispensed at high pressure through the one dispensing valve 135. The scale 70 reads the amount dispensed into the container 72 and indicates the value to the controller 76, for example if 29.20 grams of Green PC needs to be disposed, the first high flow dispensation under high pressure may approach 28.1 grams. Based upon the tolerance inputted into the controller 26 (in terms of percentages), the controller 76 may select to dispense an additional amount of PC using the high flow dispensing valve 135.

Figure 13:
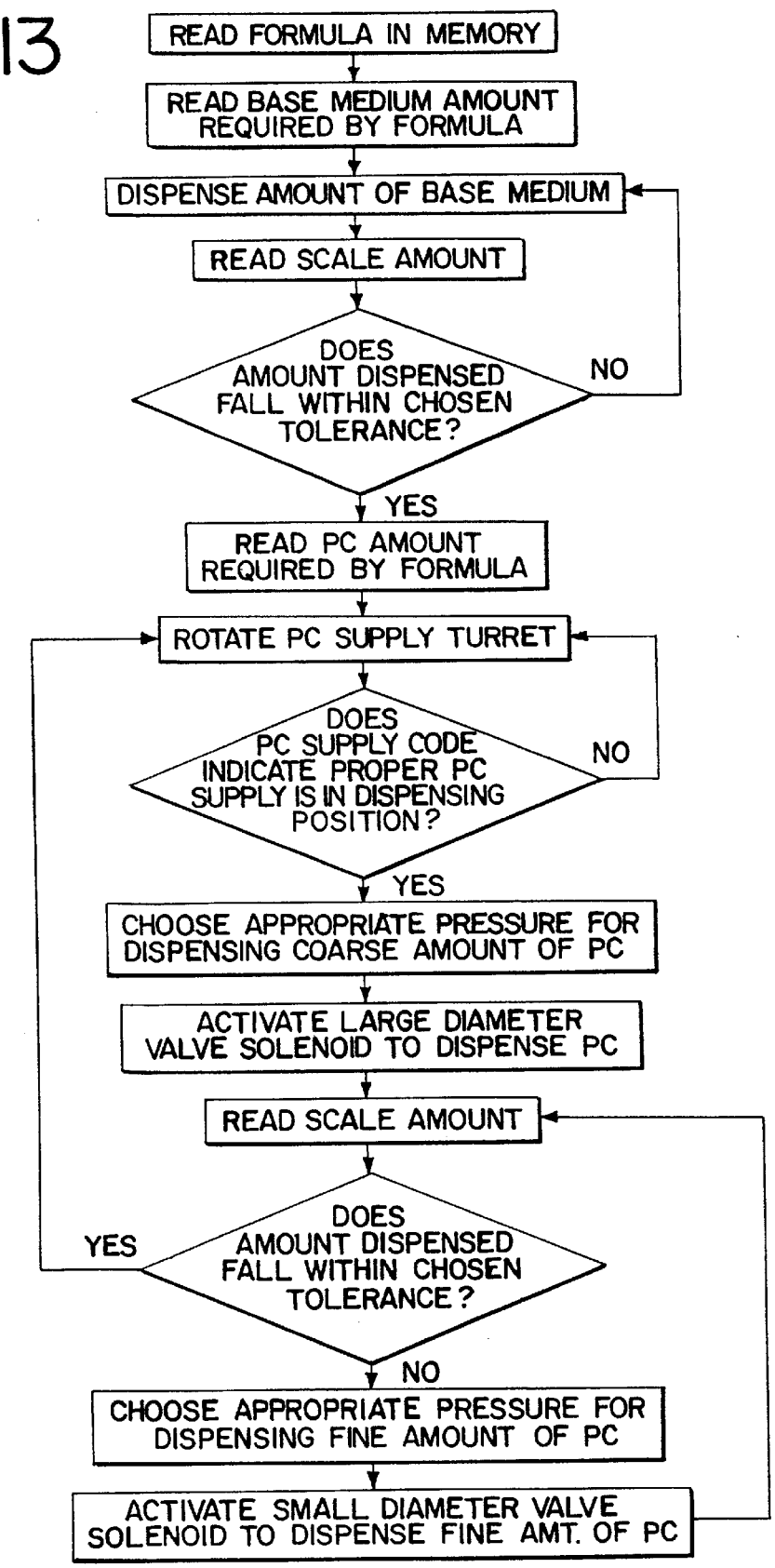
FIG. 13 is a flow chart illustrating the steps of dispensing a base medium and a PC into a container for mixing.

Typically, in instances when less than 1.5 or 1.0 grams of PC remains to be dispensed, the controller 76 will change the fluid pressure to the pumping cylinder 64 to a lower pressure and actuate the other dispensing valve 136 for a finer dispensation of PC. This second dispensing iteration may add and additional 0.8 grams of Green PC to the container 72 bringing its total dispensed weight to 28.9 grams (as shown in the legend 192 appearing on the visual display screen 190) of the control console 78. If the total weight dispensed is within the programmable tolerance, such as 2% for example, the display legend 192 will indicate that final amount dispensed as an "ACTUAL" amount so that the operator may clearly see the end amount dispensed. The process is repeated for subsequent PC colors. FIG. 13 generally illustrates the series of steps performed by the apparatus 50 by way of its controller 76, it being understood that when all of the PCs called for in the formula have been dispensed, the apparatus 50 will end its dispensing cycle.

Figure 12:
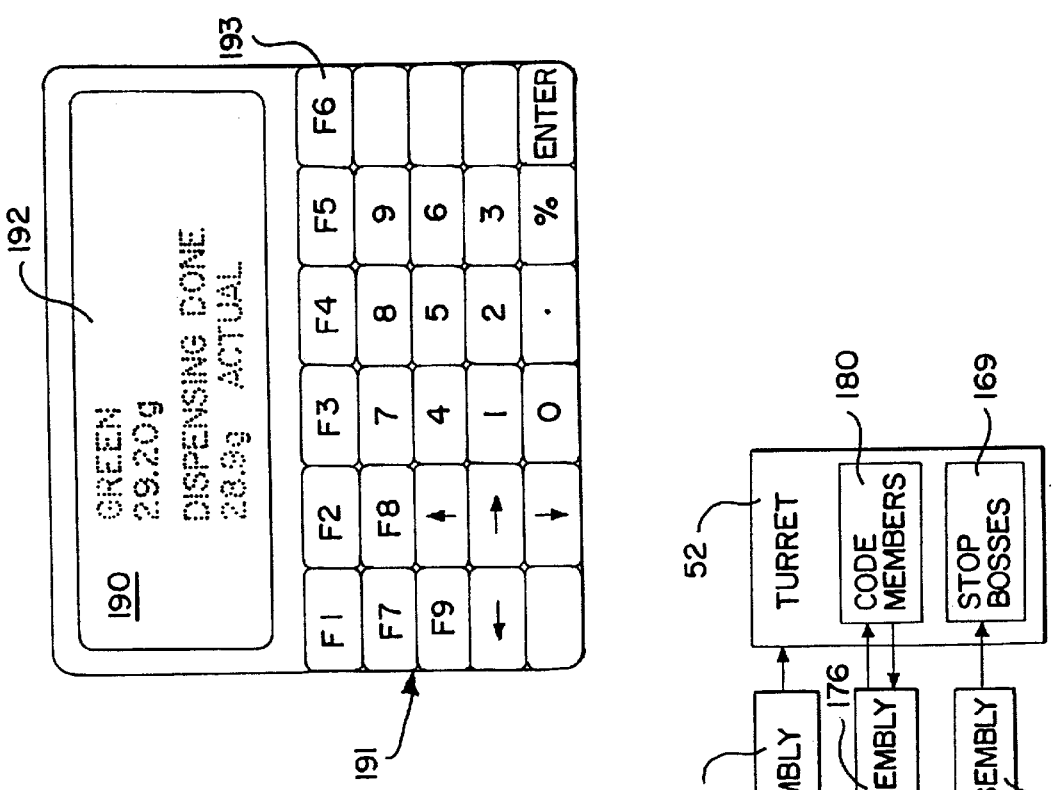
FIG. 12 is a plan view of a keypad and display screen used in the controller of the dispensing apparatus of FIG. 1.

The controller 76 also includes an internal memory 189 of a size sufficient to retain a series of paint/ink formulas or recipes. As illustrated in FIG. 12, the controller keypad 191 is equipped with various "function" keys 193 to permit an operator to correct or modify an existing paint/ink formula or to add an entirely new formula to the controller 76.

The high-viscosity screen paint/ink concentrates are normally mixed together with a lower viscosity screen printing base medium to produce a final paint/ink with desirable flow and spread characteristics. This base medium constitutes the bulk of the weight of the final mixed paint/ink (in the order of several hundred grams) and has a higher viscosity than the pigment concentrates in the order of 175,000 Centipoise. Accordingly, such a base medium is not held in the PC supply cylinders 60, but rather is separately supplied. As illustrated in FIG. 1, a series of three dispensing nozzles 200, 201, 202 are located above the mixing container 72 and beneath the dispensing valve assemblies 66 of the turret 52. One such dispensing valve 200 is connected by a connection 204 to a large supply of base medium and a pump (not shown) for supplying on demand from the controller 76, a desired amount of base into the mixing container 72. A solenoid 206 is provided to operate the valve 200 and like solenoids 207 are provided to operate the other two valves 201, 202 which respectively provide high flow and low flow dispensing of white PC into the container.

It will be appreciated that the embodiments of the present invention which have been discussed are merely illustrative of some of the applications of this invention and that numerous modifications may be made by those skilled in the art without departing from the true spirit and scope of this invention.

For example, although the present invention has been described in terms of hydraulic powered pumps, other pumps, such as pneumatically and electrically operated pumps may provide comparable results. The controller logic may be modified to utilize more or less dispensing iteration to achieve the desired tolerances. With the dispensing apparatus of the present invention, batches of paint/ink from on quart to one gallon may be produced with individual accuracies of about +/−1% are achieved. Additionally, the location of the PC supply cylinders 60 on a rotatable turret 52 permits the use of a single pump 64 that reduces the overall size and cost of the apparatus and decreases the complexity of the controller logic needed because the control signals are delivered to one dispensing location for all of the PC colors which thereby significantly reduces input and outputs required for the controller 76.

What is claimed is:

1. An apparatus for dispensing in preselected order, a plurality of high-viscosity colorants from a plurality of discrete colorant supplies, into a container for subsequent mixing, the apparatus comprising: a base, a dispensing pump supported by the base in a dispensing location, a carousel rotatably mounted to said base, a plurality of colorant supply reservoirs disposed on said carousel in a preselected pattern, a drive mechanism for selectively driving the carousel in rotation upon said base for rotating preselected discrete colorant supply reservoirs into alignment with said dispensing pump at said dispensing location, a plurality of dispensing valve assemblies corresponding in number to the number of colorant supply reservoirs, each of the dispensing valve assemblies having first and second dispensing valves, the first and second dispensing valves having valve orifices of different dimensions such that said first dispensing valve orifice is larger than said second dispensing valve orifice, and control means for selectively controlling operation of said first and, second dispensing valves at different dispensing pressures to thereby dispense a preselected amount of colorant from a preselected colorant supply reservoir wherein each of said colorant supply reservoirs has an identification code associated therewith and said apparatus includes an assembly for reading said identification codes to identify any of said colorant supply reservoirs that occupy said dispensing position.

2. An apparatus for dispensing high-viscosity colorants from an associated supply of discrete colorants comprising: a base, a dispensing pump, a carrier mounted for rotation to said base, a plurality of colorant supply reservoirs disposed on said carrier, each colorant supply reservoir containing an amount of colorant, a drive assembly for selectively driving said carrier in rotation upon said base to position a preselected one of said colorant supply reservoirs in alignment with said dispensing pump, each of said colorant supply reservoirs including a valve assembly associated therewith, each of the valve assemblies having first and second valves, said first valve being a discharge valve through which colorant is dispensed from said colorant supply reservoir under pressure of said dispensing pump, said second valve being a recharge valve through which colorant may be added to said colorant supply reservoir.

3. The dispensing apparatus as defined in claim 2, wherein each of said colorant supply reservoir valve assemblies include a third valve, each of the third valves being a discharge valve.

4. The dispensing apparatus as defined in claim 2, wherein each of said first and third valves have distinct valve orifices, the orifice of said first valve being larger than said orifice of said second valve.

5. The dispensing apparatus as defined in claim 4, further including control means for selectively controlling operation of said first and third valves to dispense colorants from said colorant supply reservoirs at different dispensing pressures.

6. The dispensing apparatus as defined in claim 5, wherein said first and third valves include solenoid operated valves that are operatively connected to said control means.

7. The dispensing apparatus as defined in claim 3, wherein said second valves are disposed between said first and third valves.

8. The dispensing apparatus as defined in claim 2, wherein each of said recharge valves includes a check valve.

9. The dispensing apparatus as defined in claim 2, wherein said carrier includes a plurality of colorant identification assemblies, each colorant supply identification assembly being associated with a single colorant supply reservoir and displaying a unique identification code assigned to said single colorant supply reservoir to thereby identify that said single colorant supply reservoir is in said ready position, said apparatus further including means for reading said colorant supply reservoir identification codes.

10. The dispensing apparatus as defined in claim 9, wherein said colorant and supply identification assemblies are disposed along an edge of said carrier and said identification code reading means is disposed on said apparatus adjoining said carrier edge, whereby said identification code reading means reads said colorant supply identification codes as said carrier is rotated.

11. The dispensing apparatus as defined in claim 9, wherein said carrier includes a circular carousel and said colorant supply reservoirs and said colorant supply identification assemblies are disposed in circular patterns on said carousel, said colorant supply identification assemblies being offset from the particular colorant supply reservoirs they identify.

12. The dispensing apparatus as defined in claim 2, wherein each valve assembly includes a manifold associated therewith, said manifolds being interposed between said first and second valves and said colorant supply reservoirs, said colorant supply reservoirs and said first and second valves communicating with said manifolds.

13. The dispensing apparatus as defined in claim 12, further including a third valve associated with each of said valve assemblies, each of the third valves being discharge valves, said third valves each communicating with said respective manifolds.

14. The dispensing apparatus as defined in claim 2, wherein said colorants contained in said colorant supply reservoirs are pigment concentrates.

15. The dispensing apparatus as defined in claim 2, wherein said colorants contained in said colorant supply reservoirs have a viscosity of between about 15,000 centipoise and about 175,000 centipoise.

* * * * *